United States Patent [19]

Harris

[11] 4,029,403

[45] June 14, 1977

[54] SELF-ADJUSTING EYEGLASSES

[75] Inventor: Gloria W. Harris, North Miami, Fla.

[73] Assignee: The Raymond Lee Organization, Inc., New York, N.Y.; a part interest

[22] Filed: Oct. 28, 1975

[21] Appl. No.: 626,175

[52] U.S. Cl. .................................. 351/121; 351/77; 351/115; 351/116; 351/128; 351/133

[51] Int. Cl.² .......................................... G02C 5/14

[58] Field of Search .......... 351/116, 121, 149, 133, 351/140, 148, 77, 115, 128

[56] References Cited
UNITED STATES PATENTS

| | | | |
|---|---|---|---|
| 1,084,064 | 1/1914 | Blanchard | 351/116 X |
| 2,210,507 | 8/1940 | Spill | 351/116 |
| 2,640,391 | 6/1953 | Moseley | 351/148 X |
| 3,403,958 | 10/1968 | Gross | 351/153 |
| 3,476,466 | 11/1969 | Hopkins | 351/121 X |
| 3,533,687 | 10/1970 | Herzig | 351/153 X |
| 3,644,023 | 2/1972 | Villani | 351/121 |

Primary Examiner—Saxfield Chatmon, Jr.
Attorney, Agent, or Firm—Howard I. Podell

[57] ABSTRACT

A pair of eyeglasses in which the frame member is joined to each temple member and to each nose piece member by a ball joint so as to eliminate any torque pressure on the wearer, with the temples and nose pieces free to rotate to fit the profile of the wearer of the eyeglasses.

2 Claims, 4 Drawing Figures

SELF-ADJUSTING EYEGLASSES

SUMMARY OF THE INVENTION

My invention is a pair of eyeglasses in which the frame member is joined to each temple member and to each nose piece member by a ball joint so as to eliminate any torque pressure on the wearer, with the temples and nose pieces free to rotate to fit the profile of the wearer of the eyeglasses.

The eyeglasses of my invention eliminate the discomfort caused by excessive pressure of a temple or nose piece member against the ear or nose of the wearer due to maladjustment of the eyeglass frame.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
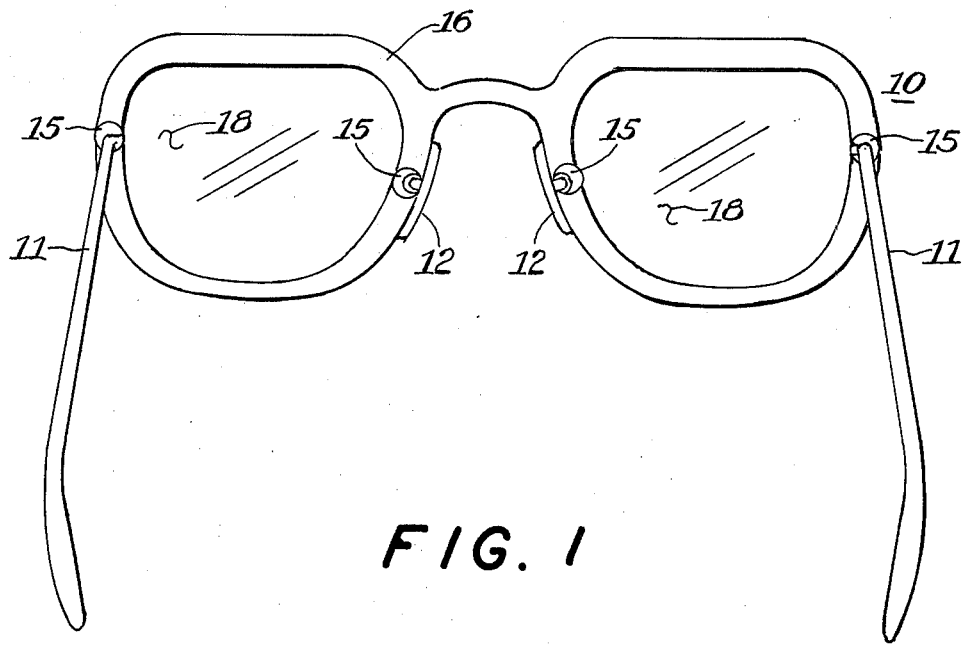
FIG. 1 is a perspective view of the invention.

Turning now descriptively to the drawings, in which similar reference characters denote similar elements throughout the several views, FIG. 1 illustrates a pair of eyeglasses 10 in which each temple piece 11 and each nose piece 12 is mounted by means of a ball and socket joint 15 to the frame 16 of the eyeglasses, which enclose the lenses 18.

Figure 2:
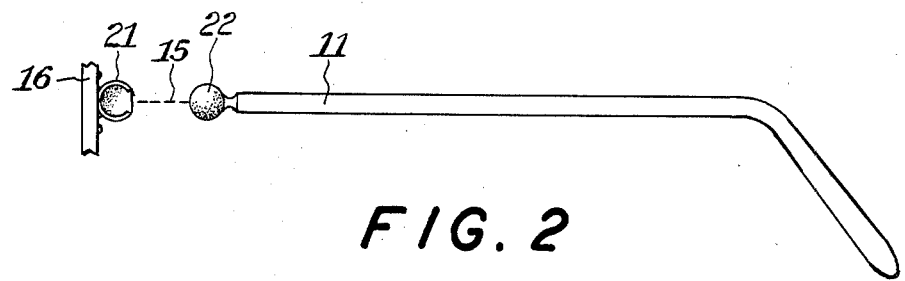
FIG. 2 is an exploded side view of a temple member and frame.
Figure 3:
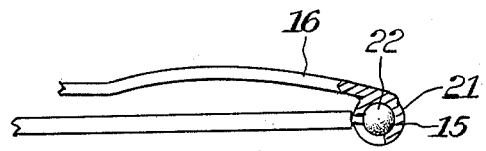
FIG. 3 is a sectional view of the temple member in the folded position.
Figure 4:
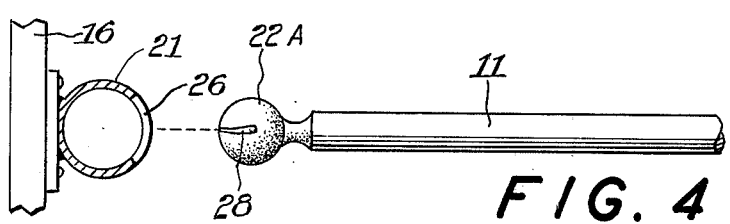
FIG. 4 is an exploded fragmentary side view of a ball and socket joint.

While the preferred embodiment, as shown in FIGS. 2–4, utilizes a ball 22 fastened to the temple 11 or nose piece 12 members and a socket 21 fastened at each location to the frame 16, the positions of the ball 22 and socket 21 may be reversed.

As shown in FIG. 4, the ball 22A may be formed with a slot 28 to enable compressing the ball 22A when fitting past the opening 26 of the socket 21, with the spring action of the material of the ball 22A enabling the ball to expand in the socket 21 in the assembled state.

By means of this invention, each nose piece 12 and a temple piece 11 may orient at an angle to the attached frame 16 so as to furnish optimum comfort to the wearer while the ball and socket joints 15 furnish full vertical and horizontal support between the nose pieces, temple pieces and frame.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A pair of eyeglasses comprising a frame member enclosing a pair of eyeglass lenses, a pair of individual temple pieces and a pair of individual nose support pieces, with each temple piece and each nose support piece individually mounted by a ball and socket joint to the frame member, such that each of the two temple pieces and each of the two nose support pieces are pivotally mounted with respect to the frame and with respect to each of the other said pieces.

2. The combination as recited in claim 1 in which a ball member is slotted so as to provide elastic deflection, when the ball is compressed in fitting into or out of a socket, said ball member biased to expand in the socket by spring action of the ball material, in the assembled state.

* * * * *